US012264426B2

(12) United States Patent
Snook

(10) Patent No.: US 12,264,426 B2
(45) Date of Patent: Apr. 1, 2025

(54) LAUNDRY WASHING MACHINE AND LOW PROFILE CONDUCTIVITY SENSOR THEREFOR

(71) Applicant: Midea Group Co., Ltd., Foshan (CN)

(72) Inventor: Bryan T. Snook, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 265 days.

(21) Appl. No.: 18/086,266

(22) Filed: Dec. 21, 2022

(65) Prior Publication Data

US 2024/0209556 A1    Jun. 27, 2024

(51) Int. Cl.
| | | |
|---|---|---|
| *D06F 34/22* | (2020.01) | |
| *D06F 33/32* | (2020.01) | |
| *D06F 34/08* | (2020.01) | |
| *D06F 37/26* | (2006.01) | |
| *G01F 23/24* | (2006.01) | |
| *D06F 103/06* | (2020.01) | |
| *D06F 103/18* | (2020.01) | |
| *D06F 103/20* | (2020.01) | |
| *D06F 105/02* | (2020.01) | |

(52) U.S. Cl.
CPC .............. *D06F 34/22* (2020.02); *D06F 33/32* (2020.02); *D06F 34/08* (2020.02); *D06F 37/267* (2013.01); *G01F 23/24* (2013.01); *D06F 2103/06* (2020.02); *D06F 2103/18* (2020.02); *D06F 2103/20* (2020.02); *D06F 2105/02* (2020.02)

(58) Field of Classification Search
CPC ........................................................ D06F 34/22
See application file for complete search history.

(56) References Cited

U.S. PATENT DOCUMENTS

| | | |
|---|---|---|
| 7,613,385 B2 | 11/2009 | Muenzner et al. |
| 7,705,603 B2 | 4/2010 | DorWarth et al. |
| 8,384,378 B2 | 2/2013 | Feldkamp et al. |
| 8,424,345 B2 | 4/2013 | Park et al. |
| 8,578,951 B2 | 11/2013 | Bohac et al. |
| 10,314,456 B2 | 6/2019 | Thiyagarajan et al. |
| 2013/0061889 A1 | 3/2013 | Bastigkeit et al. |

FOREIGN PATENT DOCUMENTS

| | | |
|---|---|---|
| CN | 105002697 B | 8/2017 |
| CN | 107110839 B | 4/2019 |
| EP | 3159683 A1 | 4/2017 |
| KR | 100329274 B1 | 3/2002 |
| KR | 100971018 B1 | 7/2010 |
| WO | 2021022780 A1 | 2/2021 |

OTHER PUBLICATIONS

Innovative Sensor Technology; "Conductivity Sensor For Various Conductivity Measurement Applications"; 12 pages; retrieved on Nov. 5, 2022.

*Primary Examiner* — Jason Y Ko
(74) *Attorney, Agent, or Firm* — Gray Ice Higdon

(57) ABSTRACT

A low profile conductivity sensor for a laundry washing machine includes a pair of electrodes that extend substantially parallel to a wall of a wash tub of the laundry washing machine to which the low profile conductivity sensor is mounted and that have respective sensing surfaces that are substantially flush with a housing surface of the sensor housing, and in some instances, with a wall of the laundry washing machine, to reduce the collection of lint and/or hair by the low profile conductivity sensor.

20 Claims, 6 Drawing Sheets

LAUNDRY WASHING MACHINE AND LOW PROFILE CONDUCTIVITY SENSOR THEREFOR

BACKGROUND

Laundry washing machines are used in many single-family and multi-family residential applications to clean clothes and other fabric items. Due to the wide variety of items that may need to be cleaned by a laundry washing machine, many laundry washing machines provide a wide variety of user-configurable settings to control various aspects of a wash cycle such as water temperatures and/or amounts, agitation, soaking, rinsing, spinning, etc. The settings cycle can have an appreciable effect on washing performance, as well as on energy and/or water consumption, so it is generally desirable for the settings used by a laundry washing machine to appropriately match the needs of each load washed by the machine.

Some laundry washing machines also support user selection of load types, typically based on the types of fabrics and/or items in the load. Some laundry washing machines, for example, have load type settings such as colors, whites, delicates, cottons, permanent press, towels, bedding, heavily soiled items, etc. These manually-selectable load types generally represent specific combinations of settings that are optimized for particular load types so that a user is not required to select individual values for each of the controllable settings of a laundry washing machine.

While manual load type selection in many cases simplifies a user's interaction with a laundry washing machine, such manual selection still can lead to suboptimal performance due to, for example, user inattentiveness or lack of understanding. Therefore, a significant need continues to exist in the art for an automated manner of optimizing the performance of a laundry washing machine for different types of loads, as well as reducing the burden on users when interacting with a laundry washing machine.

In addition, various sensors may be used to determine characteristics of a load in connection with determination of a load type, as well as to monitor various aspects of a wash cycle. For example, conductivity sensors may be used in some laundry washing machines for various purposes, e.g., to sense properties of the fluid in a wash tub, including, for example, fluid level, detergent level, soil level, etc. Conductivity sensors used in laundry washing machines generally rely on a pair of electrodes that project into the wash tub to sense a conductivity across a gap defined between the electrodes. It has been found, however, that the design of such conductivity sensors is generally susceptible to collecting lint and hair within the gap between the electrodes that interfere with the accuracy of conductivity measurements, which can lead to reduced washing performance.

SUMMARY

The invention addresses these and other problems associated with the art by providing a low profile conductivity sensor for a laundry washing machine that includes a pair of electrodes that extend substantially parallel to a wall of a wash tub of the laundry washing machine to which the low profile conductivity sensor is mounted and that have respective sensing surfaces that are substantially flush with a housing surface of the sensor housing, and in some instances, with a wall of the laundry washing machine, to reduce the collection of lint and/or hair by the low profile conductivity sensor.

Therefore, consistent with one aspect of the invention, a laundry washing machine may include a housing, a wash tub disposed within the housing and including a wall facing an interior of the wash tub, and a low profile conductivity sensor coupled to the wash tub to sense conductivity of a fluid disposed in the interior of the wash tub. The low profile conductivity sensor includes a sensor housing coupled to the wall of the wash tub and having a housing surface facing the interior of the wash tub and extending substantially parallel to the wall of the wash tub, and first and second electrodes disposed in the sensor housing and extending substantially parallel to the wall of the wash tub and to one another, the first and second electrodes having respective sensing surfaces that are substantially flush with the housing surface of the sensor housing.

In some embodiments, the housing surface of the sensor housing is substantially flush with the wall of the wash tub. Also, in some embodiments, the first electrode has a length extending substantially parallel to the wall of the wash tub and defining a largest dimension thereof. Further, in some embodiments, the sensing surface of the first electrode has an elevational offset relative to the housing surface that is within about 20% of the length of the first electrode. In some embodiments, the sensing surface of the first electrode has an elevational offset relative to the housing surface that is within about 10% of the length of the first electrode. In addition, in some embodiments, the sensing surface of the first electrode is substantially coplanar with the housing surface.

In some embodiments, the sensing surface of the first electrode has an elevational offset relative to the wall of the wash tub that is within about 20% of the length of the first electrode. In addition, in some embodiments, the sensing surface of the first electrode has an elevational offset relative to the wall of the wash tub that is within about 10% of the length of the first electrode.

Moreover, in some embodiments, the sensing surface of the first electrode is substantially planar. In some embodiments, the sensing surface of the first electrode is curved. Moreover, in some embodiments, the wall of the wash tub is a bottom wall of the wash tub.

Some embodiments may also include a controller coupled to the low profile conductivity sensor. In some embodiments, the controller is configured to determine a fluid level in the wash tub using the low profile conductivity sensor and control a valve based upon the determined fluid level. In addition, in some embodiments, the controller is configured to determine a fluid conductivity in the wash tub using the low profile conductivity sensor and determine a load type based upon the determined fluid conductivity. In some embodiments, the controller is configured to determine a fluid conductivity in the wash tub using the low profile conductivity sensor and control operation of a wash cycle based upon the determined fluid conductivity.

Moreover, in some embodiments, the wall includes a mounting aperture and the sensor housing of the low profile conductivity sensor is mounted to the wall through the mounting aperture. In addition, some embodiments may further include a gasket disposed between the sensor housing and the wall and sealing the mounting aperture. In some embodiments, the low profile conductivity sensor further includes a control circuit disposed in the sensor housing to condition a conductivity signal communicated across the first and second electrodes. In addition, in some embodiments, the low profile conductivity sensor further includes a fastener threadably engaged with the sensor housing to secure the sensor housing to the wall of the wash tub.

Consistent with another aspect of the invention, a low profile conductivity sensor for a laundry washing machine may include a sensor housing configured for mounting on a wall within the laundry washing machine and having a housing surface extending substantially parallel to the wall, and first and second electrodes disposed in the sensor housing and extending substantially parallel to the wall of the wash tub and to one another, the first and second electrodes having respective sensing surfaces that are substantially flush with the housing surface of the sensor housing.

Other embodiments may include various methods of operating a laundry washing machine and/or a low profile conductivity sensor utilizing the various operations described above.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Embodiments consistent with the invention may incorporate a low profile conductivity sensor to sense conductivity within a laundry washing machine, e.g., to determine a fluid level, to determine characteristics of a load in connection with determination of a load type, to monitor and/or control various aspects of a wash cycle, or for any other purpose for which conductivity sensors may be used. For example, a low profile conductivity sensor in some embodiments may be used to sense detergent and/or soil level for fluid disposed in a wash tub of a laundry washing machine, and due to the low profile nature of the low profile conductivity sensor, the likelihood of fouling of the sensor by lint and/or hair may be substantially reduced.

Figure 1:
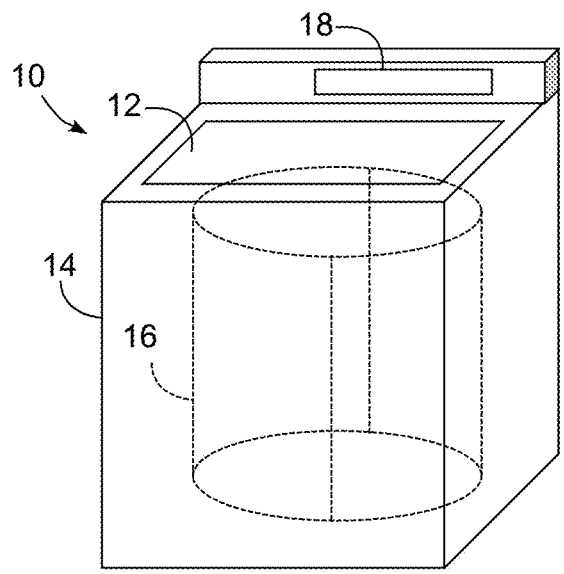
FIG. 1 is a perspective view of a top-load laundry washing machine consistent with some embodiments of the invention.

Turning now to the drawings, wherein like numbers denote like parts throughout the several views, FIG. 1 illustrates an example laundry washing machine 10 in which the various technologies and techniques described herein may be implemented. Laundry washing machine 10 is a top-load washing machine, and as such includes a top-mounted door 12 in a cabinet or housing 14 that provides access to a vertically-oriented wash tub 16 housed within the cabinet or housing 14. Door 12 is generally hinged along a side or rear edge and is pivotable between the closed position illustrated in FIG. 1 and an opened position (not shown). When door 12 is in the opened position, clothes and other washable items may be inserted into and removed from wash tub 16 through an opening in the top of cabinet or housing 14. Control over washing machine 10 by a user is generally managed through a control panel 18 disposed on a backsplash and implementing a user interface for the washing machine, and it will be appreciated that in different washing machine designs, control panel 18 may include various types of input and/or output devices, including various knobs, buttons, lights, switches, textual and/or graphical displays, touch screens, etc. through which a user may configure one or more settings and start and stop a wash cycle.

Figure 2:
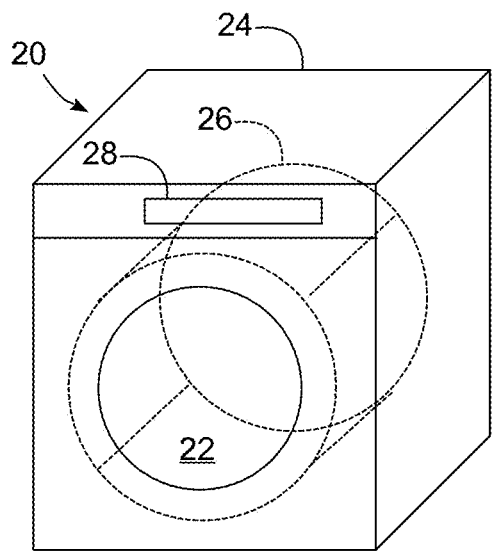
FIG. 2 is a perspective view of a front-load laundry washing machine consistent with some embodiments of the invention.

The embodiments discussed hereinafter will focus on the implementation of the hereinafter-described techniques within a top-load residential laundry washing machine such as laundry washing machine 10, such as the type that may be used in single-family or multi-family dwellings, or in other similar applications. However, it will be appreciated that the herein-described techniques may also be used in connection with other types of laundry washing machines in some embodiments. For example, the herein-described techniques may be used in commercial applications in some embodiments. Moreover, the herein-described techniques may be used in connection with other laundry washing machine configurations. FIG. 2, for example, illustrates a front-load laundry washing machine 20 that includes a front-mounted door 22 in a cabinet or housing 24 that provides access to a horizontally-oriented wash tub 26 housed within the cabinet or housing 24, and that has a control panel 28 positioned towards the front of the machine rather than the rear of the machine as is typically the case with a top-load laundry washing machine. Implementation of the herein-described techniques within a front-load laundry washing machine would be well within the abilities of one of ordinary skill in the art having the benefit of the instant disclosure, so the invention is not limited to the top-load implementation discussed further herein.

Figure 3:
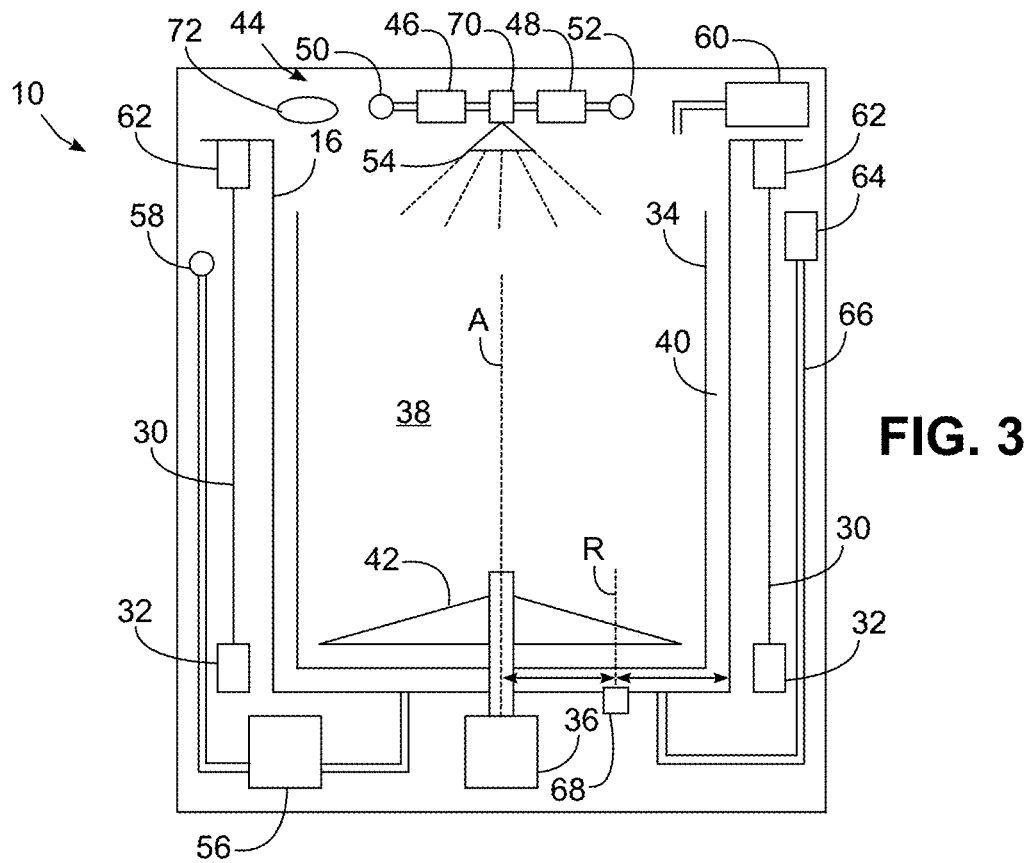
FIG. 3 is a functional vertical section of the laundry washing machine of FIG. 1 and illustrating a low profile conductivity sensor consistent with some embodiments of the invention.

FIG. 3 functionally illustrates a number of components in laundry washing machine 10 as is typical of many washing machine designs. For example, wash tub 16 may be vertically oriented, generally cylindrical in shape, opened to the top and capable of retaining water and/or wash liquor dispensed into the washing machine. Wash tub 16 may be supported by a suspension system such as a set of support rods 30 with corresponding vibration dampening springs 32.

Disposed within wash tub 16 is a wash basket 34 that is rotatable about a generally vertical axis A by a drive system 36. Wash basket 34 is generally perforated or otherwise provides fluid communication between an interior 38 of the wash basket 34 and a space 40 between wash basket 34 and wash tub 16. Drive system 36 may include, for example, an electric motor and a transmission and/or clutch for selectively rotating the wash basket 34. In some embodiments, drive system 36 may be a direct drive system, whereas in other embodiments, a belt or chain drive system may be used.

In addition, in some embodiments an agitator 42 such as an impeller, auger or other agitation element may be disposed in the interior 38 of wash basket 34 to agitate items within wash basket 34 during a washing operation. Agitator 42 may be driven by drive system 36, e.g., for rotation about the same axis as wash basket 34, and a transmission and/or clutch within drive system 36 may be used to selectively rotate agitator 42. In other embodiments, separate drive systems may be used to rotate wash basket 34 and agitator 42.

A water inlet 44 may be provided to dispense water into wash tub 16. In some embodiments, for example, hot and cold inlet valves 46, 48 may be coupled to external hot and cold water supplies through hot and cold inlets 50, 52, and may output to one or more nozzles 54 to dispense water of varying temperatures into wash tub 16. In addition, a pump or drain system 56, e.g., including a pump and an electric motor, may be coupled between a low point, bottom or sump in wash tub 16 and an outlet 58 to discharge greywater from wash tub 16. In some embodiments, it may be desirable to utilize multiple nozzles 54, and in some instances, oscillating nozzles 54, such that water dispensed into the wash tub is evenly distributed over the top surface of the load. As will become more apparent below, in some instances, doing so may maximize the amount of water absorbed by the load prior to water reaching the bottom of the wash tub and being sensed by a fluid level sensor.

In some embodiments, laundry washing machine 10 may also include a dispensing system 60 configured to dispense detergent, fabric softener and/or other wash-related products into wash tub 16. Dispensing system 60 may be configured in some embodiments to dispense controlled amounts of wash-related products, e.g., as may be stored in a reservoir (not shown) in laundry washing machine 10. In other embodiments, dispensing system 60 may be used to time the dispensing of wash-related products that have been manually placed in one or more reservoirs in the machine immediately prior to initiating a wash cycle. Dispensing system 60 may also, in some embodiments, receive and mix water with wash-related products to form one or more wash liquors that are dispensed into wash tub 16. In still other embodiments, no dispensing system may be provided, and a user may simply add wash-related products directly to the wash tub prior to initiating a wash cycle.

It will be appreciated that the particular components and configuration illustrated in FIG. 3 is typical of a number of common laundry washing machine designs. Nonetheless, a wide variety of other components and configurations are used in other laundry washing machine designs, and it will be appreciated that the herein-described functionality generally may be implemented in connection with these other designs, so the invention is not limited to the particular components and configuration illustrated in FIG. 3.

Further, to support automated load type selection or otherwise to support automated selection of various operational settings, laundry washing machine 10 may also include a weight sensing system, and optionally various additional sensors such as a fluid level sensor, a fluid property sensor, a flow sensor, a color detection sensor, etc., as will be discussed in greater detail below. A weight sensing system may be used to sense the mass or weight of the contents of wash tub 16, e.g., when the wash tub is filled with water or even prior to filling the wash tub. In the illustrated embodiment, for example, a weight sensing system consistent with the invention may be implemented in laundry washing machine 10 at least in part using one or more weight sensors 62 that support wash tub 16 on one or more corresponding support rods 30. Each weight sensor 62 may be an electro-mechanical sensor that outputs a signal that varies with a displacement based on applied force (here, also representative of load or weight), and thus outputs a signal that varies with the weight of the contents of wash tub 16. Multiple weight sensors 62 may be used in some embodiments, and in some embodiments, the weight sensors may be implemented using load cells, while in other embodiments, other types of transducers or sensors that generate a signal that varies with applied force, e.g., strain gauges, may be used. Furthermore, while weight sensors 62 are illustrated as supporting wash tub 16 on support rods 30, the weight sensors may be positioned elsewhere in a laundry washing machine to generate one or more signals that vary in response to the weight of the contents of wash tub 16. In some embodiments, for example, transducers may be used to support an entire laundry washing machine, e.g., one or more feet of a machine. Other types and/or locations of transducers suitable for generating a signal that varies with the weight of the contents of a wash tub will be apparent to one of ordinary skill in the art having the benefit of the instant disclosure. In addition, in some embodiments, a weight sensing system may also be used for vibration sensing purposes, e.g., to detect excessive vibrations resulting from an out-of-balance load. In other embodiments, however, no vibration sensing may be used, while in other embodiments, separate sensors may be used to sense vibrations. Further, in some embodiments, a single weight sensor employing a load cell or other transducer may be used (e.g., disposed proximate a corner of the housing), and the wash basket may be rotated when sensing the weight of the load such that a weight may be determined by averaging multiple force values captured during rotation of the wash basket.

A fluid level sensor may be used in some embodiments to generate a signal that varies with the level or height of fluid in wash tub 16. In the illustrated embodiment, for example, a fluid level sensor may be implemented using a pressure sensor 64 in fluid communication with a low point, bottom or sump of wash tub 16 through a tube 66 such that a pressure sensed by pressure sensor 64 varies with the level of fluid within the wash tub. It will be understood that the addition of fluid to the wash tub will generate a hydrostatic pressure within the tube that varies with the level of fluid in the wash tub, and that may be sensed, for example, with a piezoelectric or other transducer disposed on a diaphragm or other movable element. It will be appreciated that a wide variety of pressure sensors may be used to provide fluid level sensing, including, among others, combinations of pressure switches that trigger at different pressures. It will also be appreciated that fluid level in the wash tub may also be sensed using various non-pressure based sensors, e.g., optical sensors, float sensors, laser sensors, etc. Fluid level sensing may also be sensed in some embodiments using a low profile conductivity sensor as disclosed herein.

Additional sensors may also be incorporated into laundry washing machine 10. For example, in some embodiments, a fluid property sensor 68 may be used to measure various properties of the fluid in the wash tub, e.g., conductivity and/or turbidity, e.g., to sense the presence or relative amount of various wash-related products such as detergents or fabric softeners and/or to sense the presence or relative amount of soil in the fluid. Further, in some embodiments, fluid property sensor 68 may also measure other characteristics of the fluid in wash tub 16, e.g., temperature. In other embodiments, separate sensors may be used to measure turbidity, conductivity and/or temperature, and further, other sensors may be incorporated to measure additional fluid characteristics. A fluid property sensor consistent with the invention may therefore be considered to include both a single sensor and a combination of sensors that are capable of sensing one or more fluid properties of a fluid. In one example embodiment, fluid property sensor 68 is a low profile conductivity sensor as disclosed herein.

In addition, in some embodiments, a flow sensor 70 such as one or more flowmeters may be used to sense an amount of water dispensed into wash tub 16. In other embodiments, however, no flow sensor may be used. Instead, water inlet 44 may be configured with a static and regulated flow rate such that the amount of water dispensed is a product of the flow rate and the amount of time the water is dispensed. Therefore, in some embodiments, a timer may be used to determine the amount of water dispensed into wash tub 16.

In some instances, a color detection sensor 72 may be used to capture color composition data of one or more items of a load. In some embodiments, the color detection sensor 72 may be positioned to capture the color composition data as items are added to the wash tub 16. In some embodiments, the color detection sensor 72 may be an image sensor, or a camera.

Figure 4:
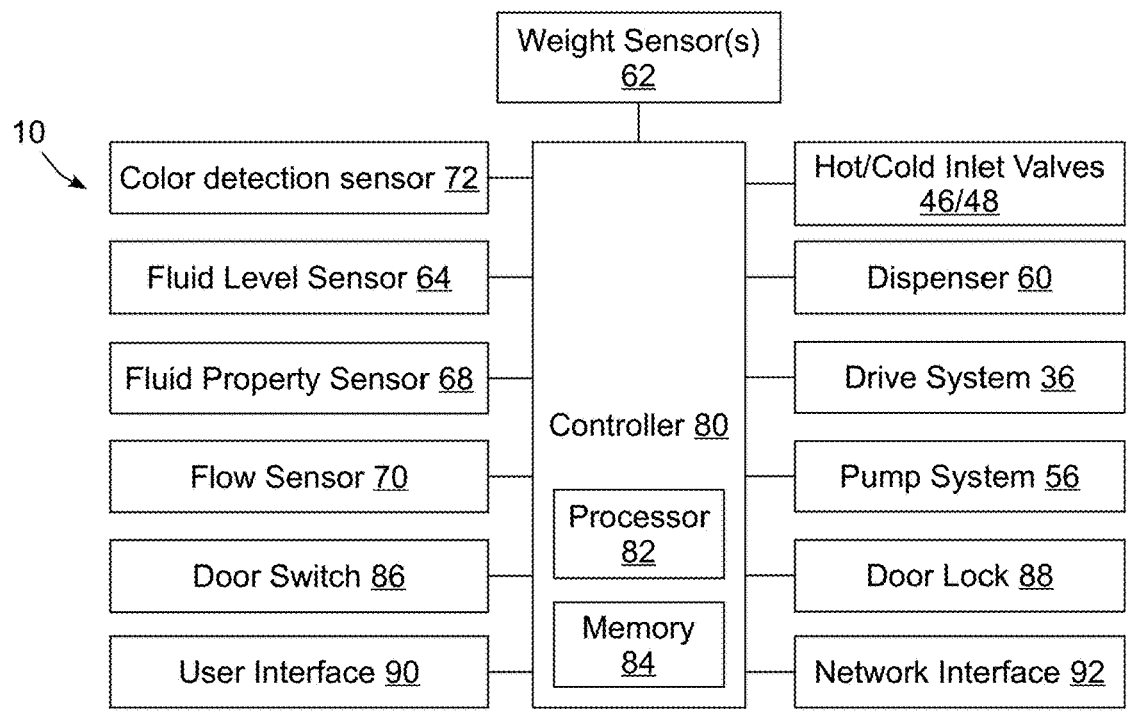
FIG. 4 is a block diagram of an example control system for the laundry washing machine of FIG. 1.

Now turning to FIG. 4, laundry washing machine 10 may be under the control of a controller 80 that receives inputs from a number of components and drives a number of components in response thereto. Controller 80 may, for example, include one or more processors 82 and a memory 84 within which may be stored program code for execution by the one or more processors. The memory may be embedded in controller 80, but may also be considered to include volatile and/or non-volatile memories, cache memories, flash memories, programmable read-only memories, read-only memories, etc., as well as memory storage physically located elsewhere from controller 80, e.g., in a mass storage device or on a remote computer interfaced with controller 80. Controller 80 may also be implemented as a microcontroller in some embodiments, and as such these terms are used interchangeably herein. Controller 80 may also include specialized circuit logic in some embodiments, which may be integrated into one or more integrated circuits in some embodiments, including into an integrated circuit that also incorporates one or more processors and/or memory (also referred to herein as a processor integrated circuit) and/or which may be separate from any integrated circuit (e.g., including logic circuitry on the same or a different module or circuit board).

As shown in FIG. 4, controller 80 may be interfaced with various components, including the aforementioned drive system 36, hot/cold inlet valves 46, 48, drain or pump system 56, dispenser 60, weight sensor(s) 62, fluid flow sensor 64, fluid property conductivity sensor 68, flow sensor 70, and color detection sensor 72. In addition, controller 80 may be interfaced with additional components such as a door switch 86 that detects whether door 12 is in an open or closed position and a door lock 88 that selectively locks door 12 in a closed position. Moreover, controller 80 may be coupled to a user interface 90 including various input/output devices such as knobs, dials, sliders, switches, buttons, lights, textual and/or graphics displays, touch screen displays, speakers, image capture devices, microphones, etc. for receiving input from and communicating with a user. In some embodiments, controller 80 may also be coupled to one or more network interfaces 92, e.g., for interfacing with external devices via wired and/or wireless networks such as Ethernet, Bluetooth, NFC, cellular and other suitable networks, including external devices such as end user computers, mobile phones, tablets, etc. and/or one or more cloud services. Additional components may also be interfaced with controller 80, as will be appreciated by those of ordinary skill having the benefit of the instant disclosure. Moreover, in some embodiments, at least a portion of controller 80 may be implemented externally from a laundry washing machine, e.g., within a mobile device, a cloud computing environment, etc., such that at least a portion of the functionality described herein is implemented within the portion of the controller that is externally implemented.

In some embodiments, controller 80 may operate under the control of an operating system and may execute or otherwise rely upon various computer software applications, components, programs, objects, modules, data structures, etc. In addition, controller 80 may also incorporate hardware logic to implement some or all of the functionality disclosed herein. Further, in some embodiments, the sequences of operations performed by controller 80 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Low Profile Conductivity Sensor

Embodiments consistent with the invention may incorporate a low profile conductivity sensor that is less susceptible to fouling by lint and/or hair due to the use of electrodes that extend substantially parallel to a wall in a laundry washing machine and to one another, and that have sensing surfaces that are substantially flush with a housing surface of the sensor. Conventional conductivity sensors using in laundry washing machines, in particular, generally extend out perpendicular to the walls to which they are mounted, and define a gap between a pair of electrodes within which debris such as lint and hair can collect over time. The collection of such debris can foul the conductivity sensors and thereby interfere with the accuracy of conductivity measurements made using such sensors. Given that dirty laundry loads in some households can have a substantial amount of human and/or pet hair, and that some types of clothing and fabrics can be highly susceptible to lint, etc., conductivity sensor fouling can become a significant issue for many consumers. Moreover, consumers may generally not be aware when fouling occurs, so sub-optimal washing performance may occur due to inaccurate conductivity measurements and may never be rectified, particularly if a consumer never cleans the conductivity sensor as a part of regular maintenance.

Figure 5:
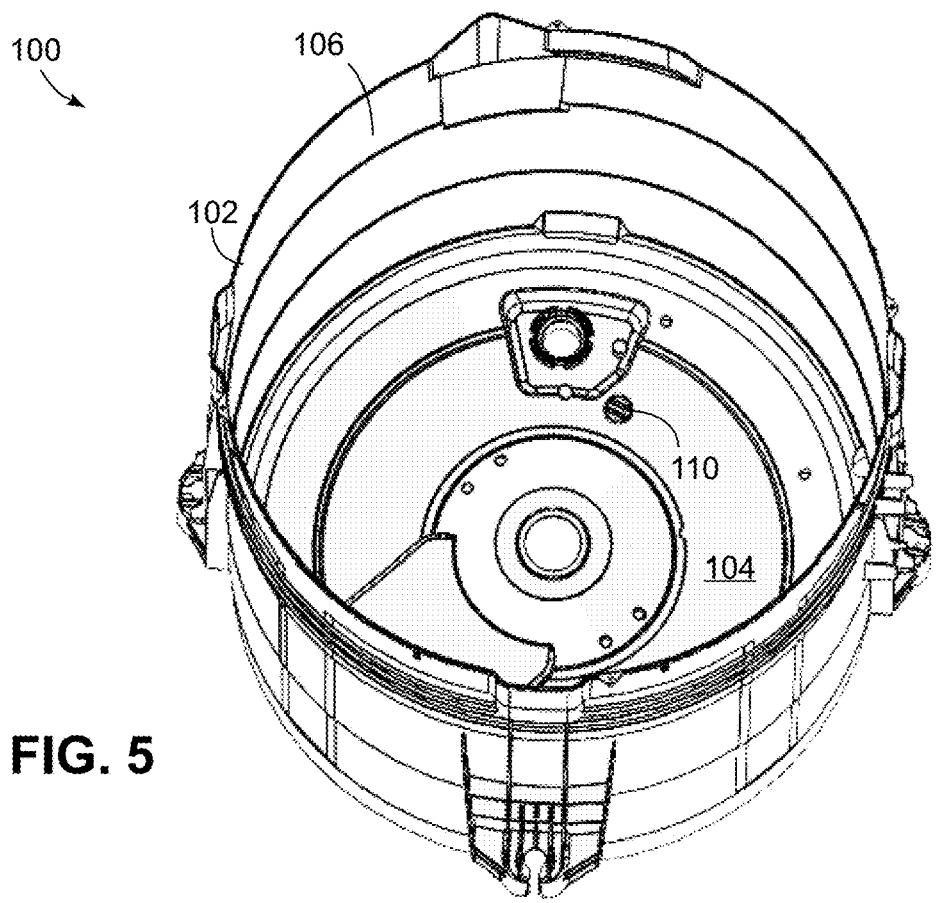
FIG. 5 is a perspective view of a wash tub including a low profile conductivity sensor consistent with some embodiments of the invention.

While conductivity sensors may be used in various applications within a laundry washing machine or otherwise (e.g., for level sensing), FIG. 5 illustrates one suitable application of a conductivity sensor, within a wash tub 100 having a generally cylindrical side wall 102 and a bottom wall 104 defining an interior within which fluid such as water and/or detergent, as well as a load may be housed. In this embodiment, a low profile conductivity sensor 110 is mounted to bottom wall 104 of wash tub 100, and is positioned suitably for sensing a conductivity of fluid housed within wash tub 100.

Figure 6:
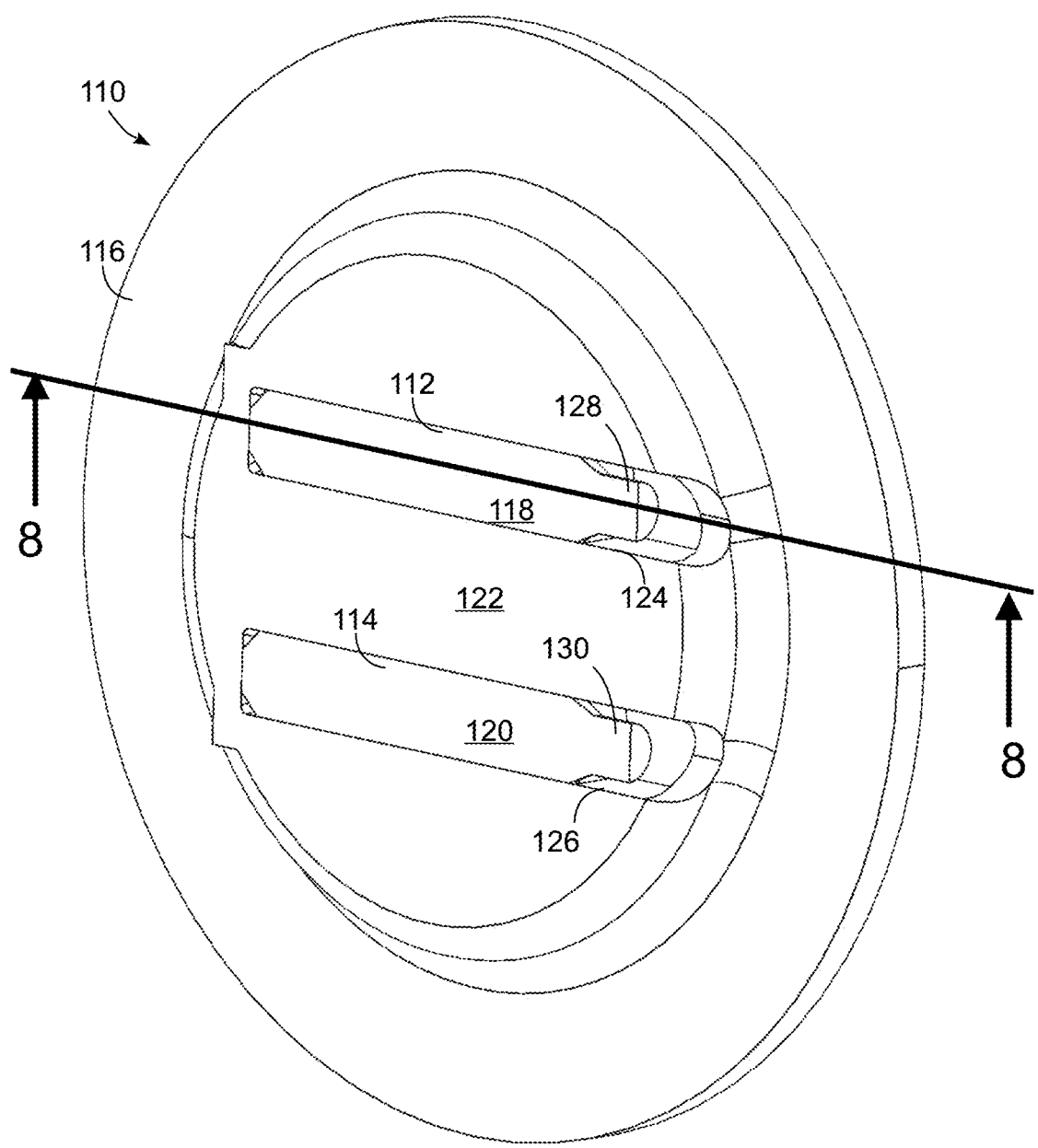
FIG. 6 is a front perspective view of a portion of the low profile conductivity sensor of FIG. 5.
Figure 7:
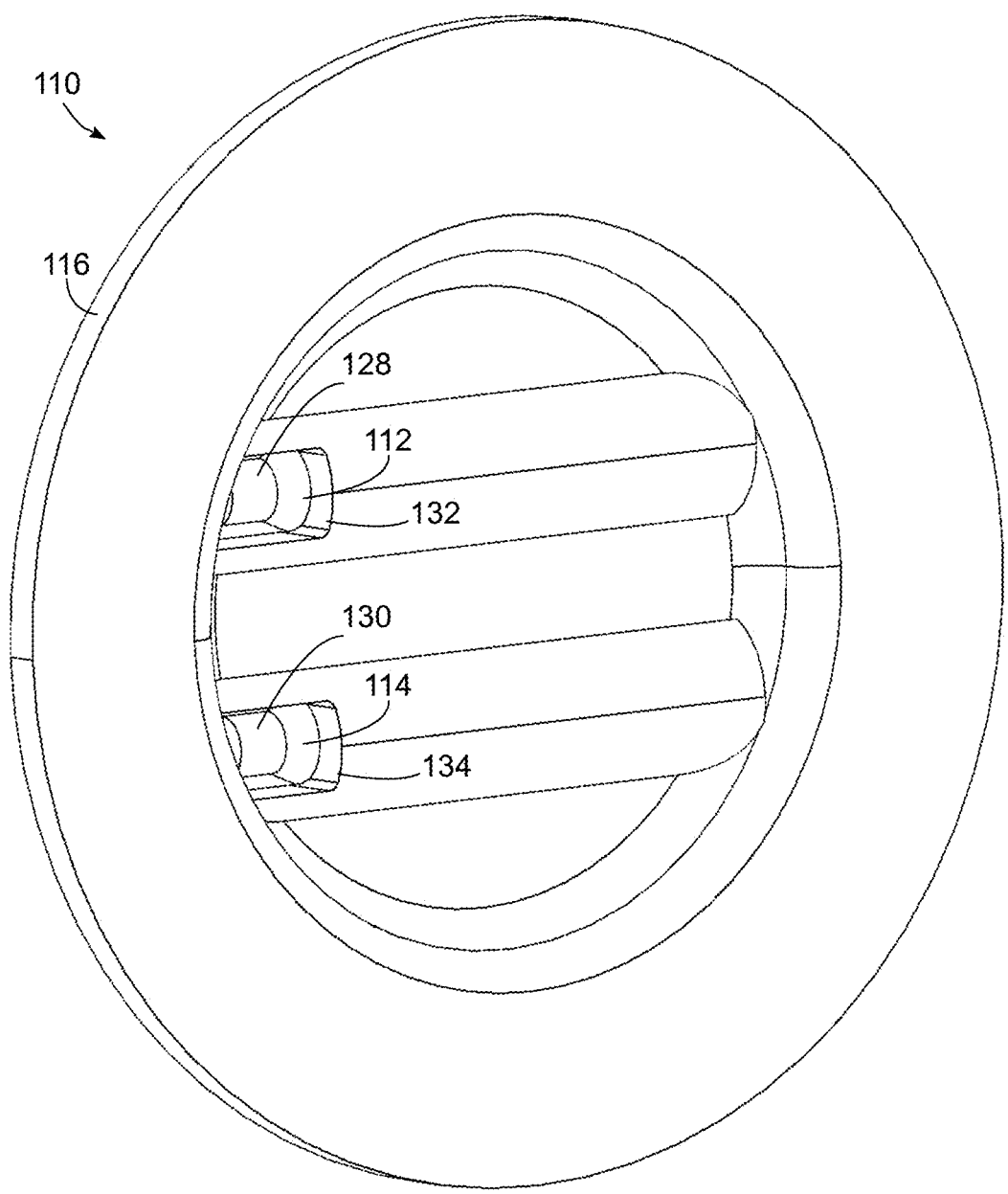
FIG. 7 is a rear perspective view of a portion of the low profile conductivity sensor of FIG. 6.
Figure 8:
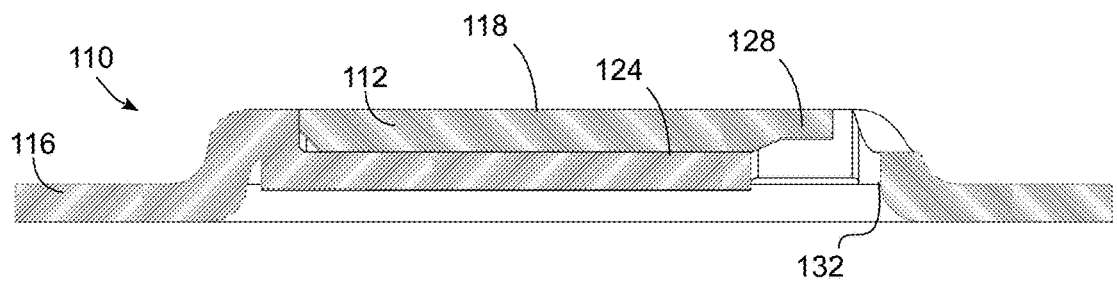
FIG. 8 is a cross-sectional view taken through lines 8-8 of FIG. 6.

FIG. 6-8 illustrate a portion of low profile conductivity sensor 110 in greater detail. Low profile conductivity sensor 110 includes a pair of electrodes 112, 114 disposed in a sensor housing 116, and having sensing surfaces 118, 120 that are outwardly facing and exposed such that they will be in contact with fluid present in wash tub 100. Sensing surfaces 118, 120 are substantially flush with a housing surface 122 of sensor housing 116, and are received within recesses 124, 126 of sensor housing 116. A pair of contact points 128, 130 are also provided on electrodes 112, 114 for mounting to one or more electrical conductors (not shown in FIGS. 6-8) suitable for conveying electrical current, and openings 132, 134 (FIG. 7) are provided on housing 116 are provided for routing the electrical conductors to control circuitry suitable for driving and/or conditioning a signal communicated between the electrodes when in the presence of a fluid to measure the conductivity of the fluid.

In some embodiments, sensor housing 116 may be molded, e.g., from plastic, and be formed with suitably-sized recesses 124, 126 to retain electrodes 112, 114, e.g., through pressure fitting or with the use of adhesive. Overmolding or comolding may also be used in some embodiments. Electrodes 112, 114 may be formed of various types of corrosion-resistant conductive material such as stainless steel, among other suitable materials.

When low profile conductivity sensor 110 is mounted in the position illustrated in FIG. 5, it will be appreciated that each of side wall 102, bottom wall 104, housing surface 122 and sensing surfaces 118, 120 face the interior of wash tub 100. Moreover, housing surface 122 and sensing surfaces 118, 120 extend substantially parallel to the portion of bottom wall 104 to which low profile conductivity sensor 110 is mounted.

Figure 9:
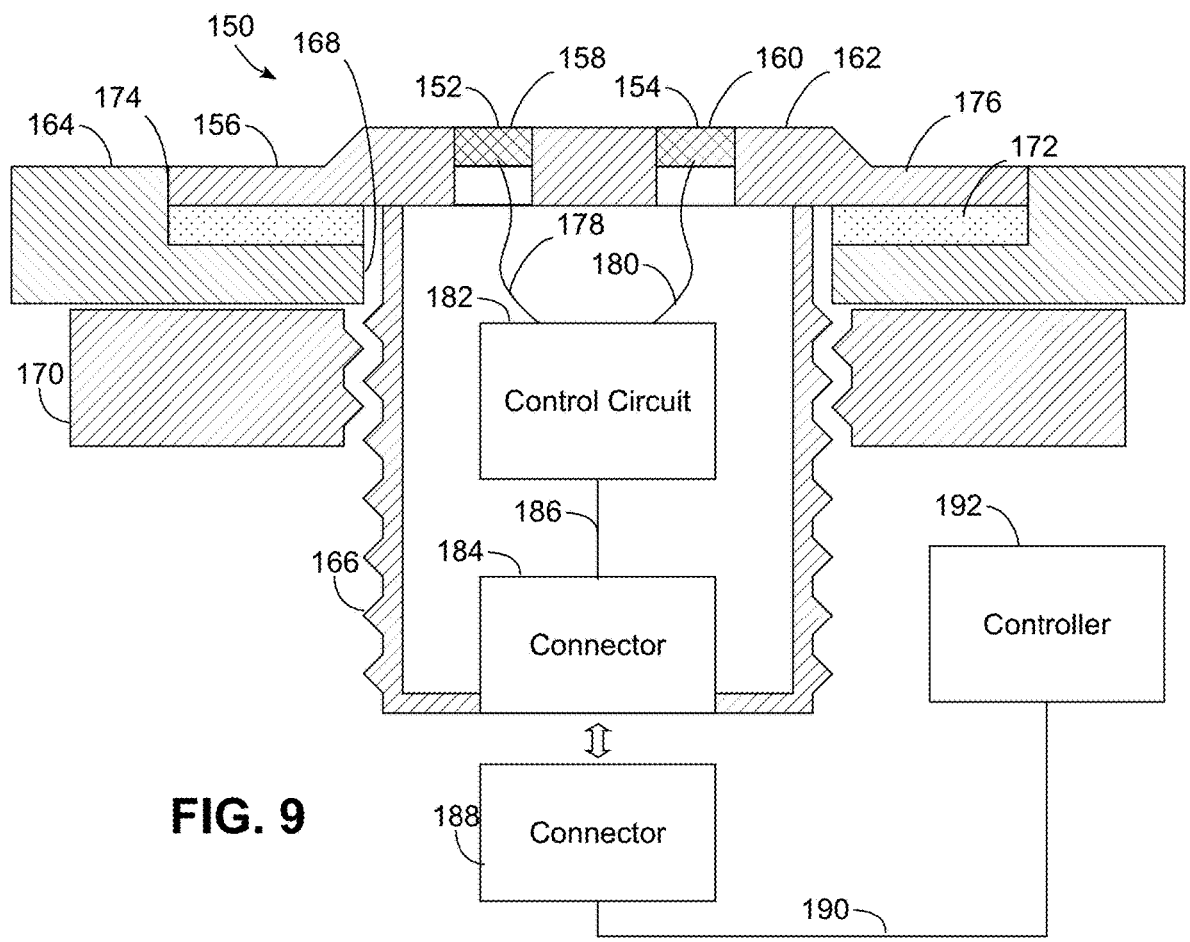
FIG. 9 is a functional cross-sectional view of another low profile conductivity sensor consistent with some embodiments of the invention.

A low profile conductivity sensor may be mounted in a laundry washing machine in a number of different suitable manners, e.g., using fasteners, tabs, pressure fittings, etc. FIG. 9, for example, illustrates an example low profile conductivity sensor 150 that includes a pair of electrodes 152, 154 mounted in a sensor housing 156 and including sensing surfaces 158, 160 that are substantially flush with a housing surface 162 defined on sensor housing 156. In this embodiment, low profile conductivity sensor 150 may be mounted to a wall 164 (e.g., of a wash tub), e.g., with a cylindrical portion 166 of sensor housing 156 projecting through a mounting aperture 168 in wall 164 and secured with a fastener (e.g., a nut) 170, with cylindrical portion 166 and fastener 170 secured to one another via cooperative threads. A gasket 172 may be used to seal mounting aperture 168, and wall 164 may include a recess 174 that receives and supports gasket 172 between wall 164 and sensor housing 156. In some embodiments, and as illustrated in FIG. 9, recess 174 may be of sufficient depth to additionally receive a sealing portion 176 of sensor housing 156 such that the sealing portion 176 is substantially coplanar with wall 164. In addition, while housing surface 162 is illustrated in FIG. 9 as being elevated relative to sealing portion 176, in other embodiments housing surface 162 and sealing portion 176 may be substantially coplanar with one another, and in some instances, substantially coplanar with wall 164. In other embodiments, no recess 174 may be provided, whereby gasket 172 and sensor housing 156 may be surface mounted on wall 164.

It will be appreciated that an innumerable number of other mounting configurations may be used to mount a low profile conductivity sensor to a wall. Therefore, the invention is not limited to the specific mounting methods described herein, as will be appreciated by those of ordinary skill having the benefit of the instant disclosure.

FIG. 9 also illustrates various electrical components that may be incorporated into a low profile conductivity sensor in various embodiments. A pair of wire leads 178, 180 electrically couple electrodes 152, 154 to a control circuit 182. Control circuit 182 may be used to operate the sensor, e.g., by driving a signal across electrodes 152, 154 and sensing one or more characteristics of that signal, as well as to further condition the signal, e.g., by filtering, reducing noise, compensating for temperature (using an integrated or external temperature sensor), converting from analog to digital, etc. Control circuit 182 may be in communication with a connector 184 over a communication link 186, and the connector 184 may be used to mate with a suitable cooperative connector 188 of a cable 190 that interfaces low profile conductivity sensor 150 with a controller 192, e.g., the main controller of a laundry washing machine.

Controller 192 may periodically poll low profile conductivity sensor 150 during operating of the laundry washing machine to perform various tasks. For example, where low profile conductivity sensor 150 is positioned to sense fluid level, e.g., along a side wall of a wash tub, controller 192 may determine a fluid level in the wash tub using low profile conductivity sensor 150 and control a valve (e.g., one or both of inlet valves 46, 48 of FIGS. 3-4) based upon the determined fluid level. Where low profile conductivity sensor 150 is positioned to sense fluid conductivity, e.g., on a bottom wall of a wash tub, controller 192 may determine a fluid conductivity in the wash tub using low profile conductivity sensor 150 and determine a load type based upon the determined fluid conductivity and/or control operation of a wash cycle based upon the determined fluid conductivity. For example, controller 192 may determine a soil level in some embodiments at least in part based upon fluid conductivity and configure one or more operational settings for a wash cycle accordingly, or may control different operations during a wash cycle based upon fluid conductivity e.g., to sense the amount of detergent added to the wash tub, to sense the amount of detergent that remains in the wash tub after a wash, rinse and/or spin operation, etc. and control aspects of a wash cycle such as the duration of a wash, rinse and/or spin operation, the spin speed, whether to repeat a wash, rinse and/or spin operation, etc.

Figure 10:
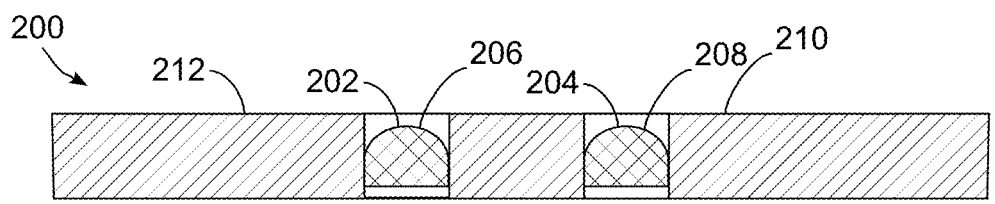
FIG. 10 is a functional cross-sectional view of a portion of another low profile conductivity sensor consistent with some embodiments of the invention.

Now turning to FIG. 10, it will be appreciated that while the sensing surfaces of low profile conductivity sensors 110 and 150 discussed above are substantially planar, other surface profiles may be used in other embodiments. Low profile conductivity sensor 200, for example, may include electrodes 202, 204 having sensing surfaces 206, 208 that are curved, rather than planar, in shape. In addition, this embodiment also illustrates that in some circumstances, sensing surfaces may be somewhat recessed relative to a housing surface 210 of a housing 212, yet still be considered to be substantially flush therewith.

Figure 11:
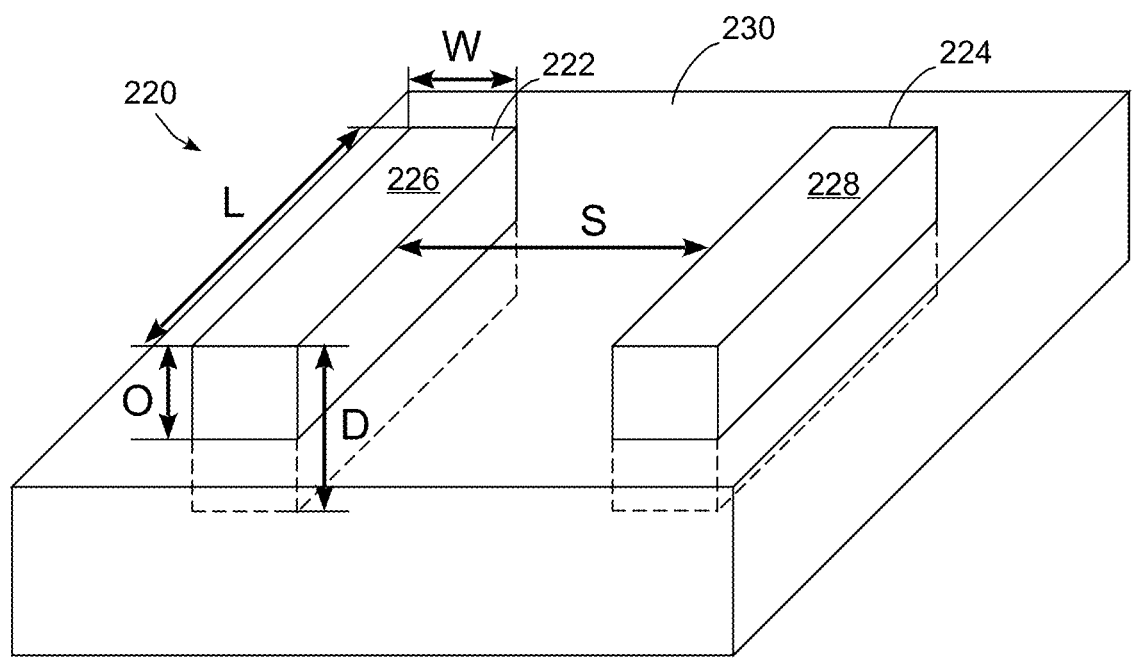
FIG. 11 is a perspective view illustrating various dimensional parameters of electrodes capable of being used in low profile conductivity sensors consistent with the invention.

FIG. 11 further illustrates various dimensions that may be relevant to a low profile conductivity sensor. Specifically, a low profile conductivity sensor 220 is functionally illustrated having a pair of electrodes 222, 224 separated by a separation S and having respective sensing surfaces 226, 228 that are offset a distance O (referred to herein as an elevational offset) from the elevation of another surface 230, which, for the purposes of the present discussion, may either be a housing surface of the sensor or a wall within a laundry washing machine.

Each electrode has a length L, a width W, and a depth D, and due to each electrode being partially recessed within surface 230, each electrode is only elevated the elevational offset O relative to surface 230, such that the portion of each electrode that is recessed is generally equal to D-O.

As noted above, a low profile conductivity sensor consistent with the invention generally includes a pair of electrodes that extend substantially parallel to a wall in a laundry washing machine and that are substantially flush with a housing surface of a sensor housing. Within the context of this disclosure, an electrode may be considered to extend substantially parallel to a wall whenever a largest dimension of the electrode, i.e., its length, extends in a direction that is substantially parallel to the plane of a portion of the wall to which the low profile conductivity sensor is mounted.

In addition, in some embodiments, the housing surface of a sensor housing of a low profile conductivity sensor may also be considered to be substantially flush with the wall to which the low profile conductivity sensor is mounted. Further, by virtue to the substantially flush relationship between the housing surface and the sensing surfaces of the electrodes, the sensing surfaces of the electrodes may also be considered to be substantially flush with the wall to which a low profile conductivity sensor is mounted in some embodiments.

It will be appreciated by those of ordinary skill having the benefit of the instant disclosure, however, that the term "substantially flush," within the context of the present disclosure, is not limited to relationships where two elements are at the exact same elevation, or are substantially coplanar with one another. Instead, in some embodiments, the elevation of a sensing surface of an electrode may still be considered to be substantially flush with another surface (e.g., a housing surface or a laundry washing machine wall) even when the sensing surface has somewhat of a positive (i.e., projects above) or negative (i.e., is recessed within) elevational offset. As a goal of a low profile conductivity sensor is to reduce fouling by debris such as hair or lint, any elevational offset that is sufficient to avoid appreciable fouling may be used.

In some embodiments, for example, the sensing surface of an electrode may be considered to be sufficiently substantially flush with a housing surface even with an elevational offset relative to the housing surface that is within about 20% of the length of the electrode, and in some embodiments, the sensing surface of an electrode may be considered to be sufficiently substantially flush with a housing surface even with an elevational offset relative to the housing surface that is within about 10% of the length of the electrode. In still other embodiments, the sensing surface may be substantially coplanar with the housing surface (e.g., as illustrated by both of low profile conductivity sensors 110, 150), where "substantially coplanar" may be considered for the purposes of the present disclosure to be an elevational offset that is within about 5% of the length of the electrode.

Likewise, in some embodiments, the sensing surface of an electrode may be considered to be sufficiently substantially flush with a wall of a laundry washing machine even with an elevational offset relative to the wall that is within about 20% of the length of the electrode, and in some embodiments, the sensing surface of an electrode may be considered to be sufficiently substantially flush with a wall of a laundry washing machine even with an elevational offset relative to the wall that is within about 10% of the length of the electrode.

It will be appreciated that, while certain features may be discussed herein in connection with certain embodiments and/or in connection with certain figures, unless expressly stated to the contrary, such features generally may be incorporated into any of the embodiments discussed and illustrated herein. Moreover, features that are disclosed as being combined in some embodiments may generally be implemented separately in other embodiments, and features that are disclosed as being implemented separately in some embodiments may be combined in other embodiments, so the fact that a particular feature is discussed in the context of one embodiment but not another should not be construed as an admission that those two embodiments are mutually exclusive of one another.

In addition, while the embodiments discussed herein are disclosed as being usable in laundry washing applications, low profile conductivity sensors consistent with the invention may be usable in other applications, including other appliance applications such as dishwashers, as well as additional applications where it is desirable to sense fluid conductivity with reduced risk of fouling in the gap between electrodes.

Various additional modifications may be made to the illustrated embodiments consistent with the invention. Therefore, the invention lies in the claims hereinafter appended.

What is claimed is:

1. A laundry washing machine, comprising:
    a housing;
    a wash tub disposed within the housing and including a wall facing an interior of the wash tub; and
    a low profile conductivity sensor coupled to the wash tub to sense conductivity of a fluid disposed in the interior of the wash tub, the low profile conductivity sensor including:
       a sensor housing coupled to the wall of the wash tub and having a housing surface facing the interior of the wash tub and extending substantially parallel to the wall of the wash tub; and
       first and second electrodes disposed in the sensor housing and extending substantially parallel to the wall of the wash tub and to one another, the first and second electrodes having respective sensing surfaces that are substantially flush with the housing surface of the sensor housing.

2. The laundry washing machine of claim 1, wherein the housing surface of the sensor housing is substantially flush with the wall of the wash tub.

3. The laundry washing machine of claim 1, wherein the first electrode has a length extending substantially parallel to the wall of the wash tub and defining a largest dimension thereof.

4. The laundry washing machine of claim 3, wherein the sensing surface of the first electrode has an elevational offset relative to the housing surface that is within about 20% of the length of the first electrode.

5. The laundry washing machine of claim 4, wherein the sensing surface of the first electrode has an elevational offset relative to the housing surface that is within about 10% of the length of the first electrode.

6. The laundry washing machine of claim 5, wherein the sensing surface of the first electrode is substantially coplanar with the housing surface.

7. The laundry washing machine of claim 3, wherein the sensing surface of the first electrode has an elevational offset relative to the wall of the wash tub that is within about 20% of the length of the first electrode.

8. The laundry washing machine of claim 7, wherein the sensing surface of the first electrode has an elevational offset relative to the wall of the wash tub that is within about 10% of the length of the first electrode.

9. The laundry washing machine of claim 1, wherein the sensing surface of the first electrode is substantially planar.

10. The laundry washing machine of claim 1, wherein the sensing surface of the first electrode is curved.

11. The laundry washing machine of claim 1, wherein the wall of the wash tub is a bottom wall of the wash tub.

12. The laundry washing machine of claim 1, further comprising a controller coupled to the low profile conductivity sensor.

13. The laundry washing machine of claim 12, wherein the controller is configured to determine a fluid level in the wash tub using the low profile conductivity sensor and control a valve based upon the determined fluid level.

14. The laundry washing machine of claim 12, wherein the controller is configured to determine a fluid conductivity in the wash tub using the low profile conductivity sensor and determine a load type based upon the determined fluid conductivity.

15. The laundry washing machine of claim 12, wherein the controller is configured to determine a fluid conductivity in the wash tub using the low profile conductivity sensor and control operation of a wash cycle based upon the determined fluid conductivity.

16. The laundry washing machine of claim 1, wherein the wall includes a mounting aperture and the sensor housing of the low profile conductivity sensor is mounted to the wall through the mounting aperture.

17. The laundry washing machine of claim 16, further comprising a gasket disposed between the sensor housing and the wall and sealing the mounting aperture.

18. The laundry washing machine of claim 1, wherein the low profile conductivity sensor further includes a control circuit disposed in the sensor housing to condition a conductivity signal communicated across the first and second electrodes.

19. The laundry washing machine of claim 1, wherein the low profile conductivity sensor further includes a fastener threadably engaged with the sensor housing to secure the sensor housing to the wall of the wash tub.

20. A low profile conductivity sensor for a laundry washing machine, the low profile conductivity sensor including:
a sensor housing configured for mounting on a wall within the laundry washing machine and having a housing surface extending substantially parallel to the wall; and
first and second electrodes disposed in the sensor housing and extending substantially parallel to the wall of the wash tub and to one another, the first and second electrodes having respective sensing surfaces that are substantially flush with the housing surface of the sensor housing.

* * * * *